(No Model.)

C. C. HODGES.
SAFETY SHIELD FOR LUBRICATOR GLASSES.

No. 362,445. Patented May 3, 1887.

WITNESSES
Samuel E. Thomas.
N. S. Wright.

INVENTOR
Charles C. Hodges,
By W. W. Leggett,
Attorney

UNITED STATES PATENT OFFICE.

CHARLES C. HODGES, OF DETROIT, MICHIGAN.

SAFETY-SHIELD FOR LUBRICATOR-GLASSES.

SPECIFICATION forming part of Letters Patent No. 362,445, dated May 3, 1887.

Application filed January 8, 1887. Serial No. 223,776. (No model.)

*To all whom it may concern:*

Be it known that I, CHARLES C. HODGES, of Detroit, county of Wayne, State of Michigan, have invented a new useful Improvement in Safety-Shields for Lubricator-Glasses, &c.; and I declare the following to be a full, clear, and exact description of the same, such as will enable others skilled in the art to which it pertains to make and use it, reference being had to the accompanying drawings, which form a part of this specification.

My invention consists of the combinations of devices and appliances hereinafter specified, and more particularly pointed out in the claims.

Figure 1:
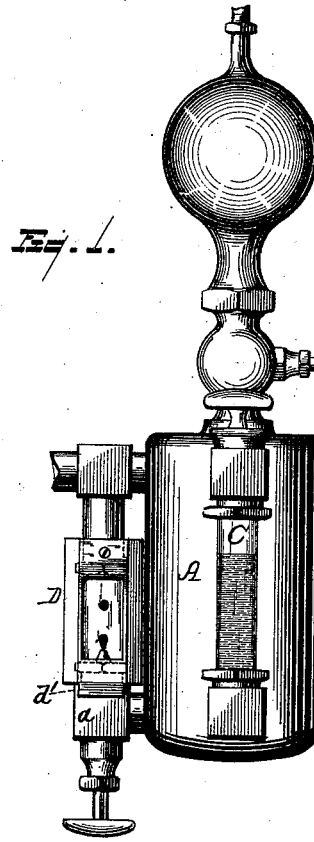
Figure 2:
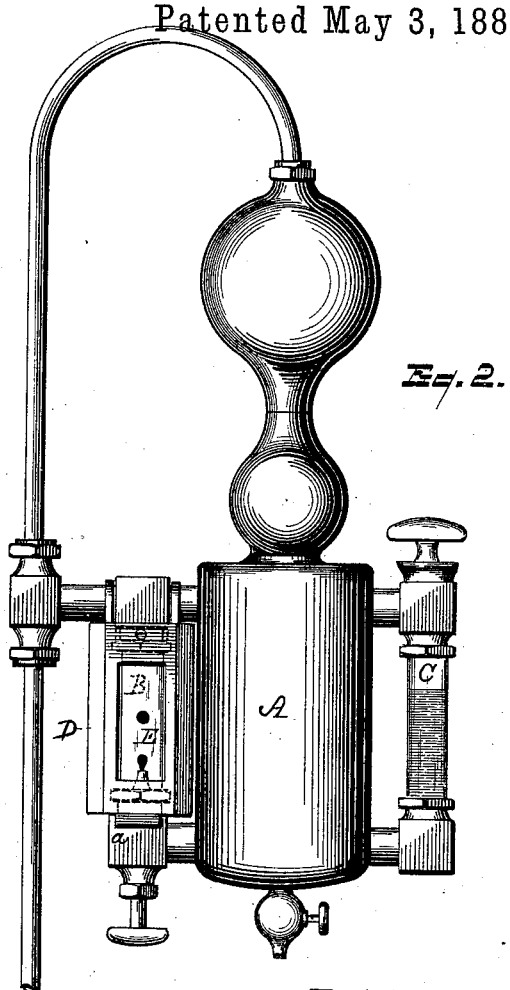
Figure 3:
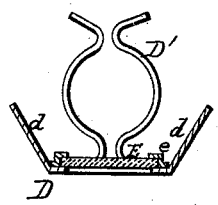
Figure 4:
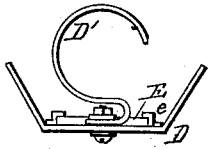
Figure 5:
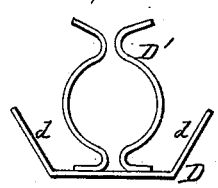
Figure 6:
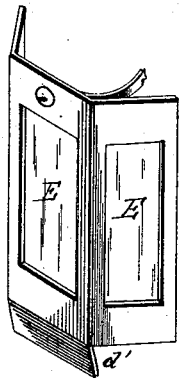

In the drawings, Figure 1 is a view of a lubricator embodying my invention. Fig. 2 represents the same as attached to the lubricator of an air-brake. Fig. 3 is a horizontal sectional view through my improved attachment. Fig. 4 is a plan view of my attachment, looking down upon its top. Fig. 5 is a view showing the bottom attachment. Fig. 6 is a perspective view of the said device.

This invention is designed to shield the engineer, fireman, or other person against danger arising from the bursting of a glass tube in a locomotive-lubricator, air-brake lubricator, or other device in which such glass tubes are employed, and I would have it understood at the outset that it is applicable as well to water-gages and to all the large variety of devices in which glass tubes are employed and required to sustain a heavy pressure from within. It serves the additional purpose of protecting the glass tubes from injury from external sources.

The invention consists, essentially, in a shield made in the form of a separate appliance which may be readily connected with the glass tube of any lubricator or other gage, &c., such as are in ordinary use.

The drawings illustrate the application of the appliance to locomotive and air-brake lubricators. A may represent any lubricator or other similar structure in which there is a feed-glass, B, and indicator-tubes or gage-glasses C.

The drawings illustrate the device as applied only to sight-feed glasses, since upon a lubricator these are the glasses most liable to burst, though it will be understood that they may be equally well applied to other glasses.

D represents my improved shield or attachment. It consists of a plate or sheet of metal or other substance of suitable strength provided with suitable springs or other clips, D', at the top and bottom, whereby the same may be readily engaged with the fitting above or below the gage-glass, or may, if desired, be adapted to engage the glass itself close to the said fitting. I prefer, however, the former construction. These clips may be made to engage by simply springing about the said glass or fitting, or they may be passed around the fitting and fastened by wire or in other convenient way. The spring-clips, however, without other fastening, I deem adequate under all ordinary circumstances.

E represents a plate of glass adapted to cover a corresponding opening in the shield D. This opening is sufficiently broad and high to afford free view of the contents of the glass tube behind it, or of the drops passing through the said glass tube if it is connected with a lubricator. This glass may be inserted in any convenient manner—thus, for instance, the metal composing the shield along those portions adjacent to the opening provided for the glass might be turned inward toward the tube and shaped into a seat for the plate of glass, and its free edge be then bent over the edge of the glass to hold it in place; or there may be provided a dovetailed recess, e, open at its upper end, into which the plate of glass may be slipped, and in this form of construction the upper clip, D', may be made removable, as shown in Fig. 4, so as to admit of the insertion of the glass E.

In many cases there may be needed only the glass plate in the front face of the shield or attachment, and in that case the inner surfaces along the portions d (shown in Fig. 3) may or may not be polished so as to reflect light against the glass tube. In any case where considerable light is required I propose to provide similar glass plates E in these side faces as well as in the front face, substantially as shown in Fig. 6 of the drawings. This attachment, instead of being in the polygonal form shown in the drawings, might be of cylindrical form. I prefer, however, to make it with the plain faces, or in polygonal form, as shown, because of the facility it affords for the insertion of the flat glass plates E.

It is apparent that when a gage-glass or the glass tubes of a lubricator are provided with this attachment the engineer, fireman, or other employé is thoroughly protected against injury by the explosion of such tubes. Such accidents are of frequent occurence, and often result in severe injury by cutting or scalding such employés; but with a device of this kind, should an explosion occur, its force would be expended upward and downward and not outward against the employé.

I am of course aware that gage-glasses have been made with permanent shields of metal caused to surround the said glasses and to form a part of the fittings of the lubricator or gage; but I am not aware that a shield of this character has been made as a separate appliance which can be readily applied as an attachment to any of the ordinary lubricators or gage-glasses as they are found in use.

It will be observed that in the form of shield shown in the drawings it is adapted to rest at the bottom upon the square fitting $a$ at the base of the glass tube, and in that event I would provide a lip, $d'$, which may be turned so as to rest against the face of the said fitting, and so prevent any tendency of the shield to rotate about the glass; but of course different constructions might require a corresponding variation in the minor features of construction, and I would have it understood that such changes may be made so as to adapt it to use in its various localities without departing from my invention. This shield is made open at its back, and is adapted to be slipped into place so as to partially embrace the glass tube and be in proper position without removing or disturbing the glass itself.

It is well known that in the use of locomotive-lubricators it is customary to locate a lamp beyond the lubricator, so as to throw its light directly upon the gage-glasses. The polished surfaces $d$ will, when this attachment is used, serve to reflect the light and direct it strongly upon the inclosed glass tube, so that said polished surfaces may thus serve the purpose of reflecting the light which enters through the opening E when the lamp is not in use, or may serve to reflect the light of the lamp when it is used as above.

What I claim is—

1. A removable and replaceable shield for the glass tube of a lubricator or other device, consisting of a shell having an opening in its face fitted with a glass for observing the contents of the tube, and clips or fastenings on the shield for removably applying the shield to the ordinary glass tube without disturbing the latter, substantially as and for the purposes described.

2. As a safety attachment for the glass tubes of lubricators, water-gages, &c., a metallic shield made of polygonal form, open at its back, and with glass-covered openings in one or more of its faces, said shield provided with clips or fastenings for engaging it with the said tubes or their fittings, substantially as and for the purposes described.

3. A removable and replaceable shield for the glass tube of a lubricator or other device, consisting of a shell having an opening fitted with a glass and provided with interior reflecting-surfaces, $d$, and clips or fastenings on the shell for detachably applying the same without disturbing the glass tube, substantially as described.

In testimony whereof I sign this specification in the presence of two witnesses.

CHARLES C. HODGES.

Witnesses:
N. S. WRIGHT,
M. B. O'DOGHERTY.